United States Patent [19]

Babin et al.

[11] 4,287,076

[45] Sep. 1, 1981

[54] PRODUCT SUITABLE FOR THE STORAGE AND CONVEYANCE OF THERMAL ENERGY

[75] Inventors: Lucien Babin; Danièle Clausse, both of Pau, France

[73] Assignee: Elf France, Paris, France

[21] Appl. No.: 73,992

[22] Filed: Sep. 10, 1979

[30] Foreign Application Priority Data

Sep. 22, 1978 [FR] France ............... 78 27166

[51] Int. Cl.³ .................... C09K 5/02; C09K 5/00
[52] U.S. Cl. ............................... 252/70; 252/308; 252/309; 252/317; 165/2; 165/104.21; 126/417; 126/452
[58] Field of Search ................ 252/70, 308, 309, 317; 176/400; 165/104 S

[56] References Cited

U.S. PATENT DOCUMENTS

| 1,887,618 | 11/1932 | Bell | 252/70 |
|---|---|---|---|
| 2,677,664 | 5/1954 | Telkes | 252/70 |
| 3,720,198 | 3/1973 | Luing et al. | 165/405 |
| 3,986,969 | 10/1976 | Telkes | 252/70 |

FOREIGN PATENT DOCUMENTS 2054057  7/1967  Fed. Rep. of Germany .
2017679  9/1978  France .

*Primary Examiner*—Mayer Weinblatt
*Attorney, Agent, or Firm*—Poms, Smith, Lande & Rose

[57] ABSTRACT

This invention concerns the storage and conveyance of thermal energy at low temperature, by using the latent heat produced by a substance during changes of state.

This substance consists of a salt producing considerable latent heat during change of state, such as $Na_2SO_4$, 10 $H_2O$, combined closely with a nucleating agent such as borax and dispersed in an oil to which an emulsifying agent has been added.

This product is particularly suitable for storage of solar energy at low temperature and for heating of enclosed areas.

14 Claims, No Drawings

PRODUCT SUITABLE FOR THE STORAGE AND CONVEYANCE OF THERMAL ENERGY

BACKGROUND OF THE INVENTION

This invention concerns the storage and conveyance of thermal energy at low temperature.

A lot of research has been done into change of state phenomena, particularly solid/liquid and liquid/solid state changes, for products with high latent heat, with the aim of reaching a solution that can be applied industrially.

Apart from the high latent heat storage potential, such products must fulfill numerous other requirements, such as lowest possible cost, availability, simplicity of preparation, absence of danger during handling, as regards toxicity, flammability and corrosion. Finally, variations in specific volume during the change of state must be taken carefully into account.

Change of state phenomena, particularly the solid/liquid state change, have been studied from this viewpoint, for simple or compound bodies, simple or complex salts, saline hydrates, eutectic mixtures, and various mixtures such as paraffins.

Experiments have shown the frequency of phenomena involving delay in initiation of the change of state in relation to the theoretical temperature defined for the phenomenon. These delays are often long, and usually vary for the same product depending on the conditions under which the change of state occurs.

The length of the delay depends on numerous factors such as the type and size of the system, type and distribution of impurities, method of preparation of the product and treatments which it has undergone since preparation. In fact, the change of state delay has to be investigated for every product in every operating situation.

In the article entitled "Solar energy storage", published in "Ashrae Journal" of September 1974, pages 40 to 43, by the American Society of Heating, Refrigerating and Air-Conditioning Engineers, 345 East 47th Street, New York NY 10017, Doctor Maria Telkes reports on a large number of change of state experiments done on various products.

Calcium chloride hexahydrate $CaCl_2$, 6 $H_2O$, although inexpensive, has the disadvantage of contributing to equilibria, producing four separate crystalline forms with different conversion points. Under certain conditions the product is corrosive.

Sodium carbonate decahydrate $Na_2CO_3$,10 $H_2O$ also participates in equilibrium reactions producing several crystalline forms.

$Na_2HPO_4$,12 $H_2O$ and Ca $(NO_3)_2$ allow simpler operating layouts to be used, but are quite expensive.

Suitable nucleating agents have been investigated for all these products, to encourage the liquid/solid change and reduce delay in change.

Sodium thiosulphate $Na_2S_2O_3$,5 $H_2O$ has also been experimented, but is quite expensive and, more important, unstable.

Sodium sulphate decahydrate $Na_2SO_4$,10 $H_2O$, which is a very cheap product, available in large quantities and which is safe to use, would appear, according to research, to offer the best prospect for industrial application.

The effectiveness of borax $Na_2B_4O_7$,10 $H_2O$ as nucleating agent has been established, apparently being related to the structure of its crystalline form, the parameters of which are close to those of sodium sulphate decahydrate.

During successive heat storage/release cycles, it has been observed that an anhydrous solid fraction $Na_2SO_4$ with a density of 2 separates out during the first part of the cycle and tends to settle at the bottom of the container, whereas during the second part of the cycle it should interact with the liquid phase to ensure optimum efficiency of conversion.

When the solid fraction of $Na_2SO_4$ settles as a deposit, there is a serious drop in the scale of reaction exhanges during the next cycle, and consequently a drop in heat release because of the reduction in interface between liquid and solid phases.

The use of mechanical agitators, or of very wide, low tanks have been suggested as a way of avoiding this segregation of $Na_2SO_4$. But such methods are in fact not very effective, nor practicable.

Doctor Telkes begins by proposing nucleation of the continuous medium by dispersing a nucleating agent with very low water solubility, such as borax $Na_2B_4O_7$,10 $H_2O$, and she also suggests the addition of thickeners to prevent $Na_2SO_4$ from settling down.

Various organic thickening agents have been used to produce formation of a gel, which blocks the movements and particularly the downward movement of $Na_2SO_4$ particles. These agents, such as starch, must be mixed with additive stabilizing agents such as formol.

This combination of methods has not produced an entirely satisfactory solution, since beyond 20 cycles the various additives become ineffective.

A silica gel, formed in the actual product, has proved to impede the movement or transfer of the product, since the whole mixture becomes too viscous.

A paraffin-water emulsion cannot be used unless a dispersing agent, such as siliceous earths, is added.

Experiments on these last two processes have shown that borax loses its nucleating effect when in the presence of silica products.

The present invention overcome these difficulties by ensuring very fine fragmentation of the active substance mixed with the nucleating agent, without increasing the liquid phase viscosity. The invention concerns a product suitable for storage and conveyance of heat energy, constituted by a dispersion of at least one salt with high latent heat storage and release capacity when undergoing a change of state, in an oil to which at least one emulsifying agent has been added, this salt being thoroughly mixed with at least one nucleating agent. The end product, when ready for storage, must contain almost no liquid water in the solution.

In this new product, at least one salt is preferably $Na_2SO_4$,10 $H_2O$ and at least one nucleating agent is preferably borax, and a recommended emulsifying agent contains lanoline.

One method of manufacturing this new product to store and convey thermal energy consists of the following succession of steps:

at least one salt comprising a hydrate having a high latent heat storage and release capacity when undergoing a change of state is dissolved in the form of a monophasic solution, and at least one nucleating agent is dispersed finely in this solution;

this solution is emulsified in the form of droplets in an oil to which at least one emulsifying agent has been added;

the emulsion is placed in a dry atmosphere which is kept at a temperature above the change of state point of the hydrate, until the concentration in the droplets is within a few percent of the specified hydrate concentration;

the emulsion is cooled down to a temperature far enough below the change of state point for this change to take place completely a first time;

the emulsion is reheated to the change of state point and thermal energy is supplied at this temperature until the temperature of the emulsion begins to rise above the change of state point;

the emulsion is recooled to a temperature far enough below the change of state point for the change to take place completely a second time;

the cycle comprising heating to the change of state point followed by cooling to a temperature far enough below this point for the change to take place completely is repeated at least once.

In one recommended process for manufacturing a product according to the invention, suitable for storage and conveyance of thermal heat, the salt is sodium sulphate, the hydrate $Na_2SO_4,10\ H_2O$ of which has a solid/liquid change of state point of 32° C., at least one nucleating agent is borax, the temperature of the dry atmosphere in which the product is placed to bring the water content close to that of the hydrate is approximately 40° C., and the liquid/solid change point, to ensure that the change takes place completely, is approximately −50° C. during the first cycle.

Using a product prepared in the way described above, any macroscopic segregation of anhydrous $Na_2SO_4$ is made impossible, because of the extreme fragmentation of the medium. Consequently, this product retains its properties for a very long, almost indefinite period. Industrial application of the product therefore becomes possible.

In this new process for storage and release of thermal energy using the product described above:

thermal energy is supplied to the product at a temperature at least equal to the change of state point until the temperature of the product begins to rise above this point;

the temperature of the product is allowed to evolve, and when it reaches the "release" point, which is at most equal to the change of state point, heat begins to be released, the temperature of the product returns to the change of state point, and thermal energy is emitted for use as required.

In one recommended embodiment, the product is constituted by an emulsion, in an oil to which an emulsifying agent has been added, of a solution of $Na_2SO_4$ close to the hydrate $Na_2SO_4,10\ H_2O$, in which borax has been finely dispersed as nucleating agent, the change of state equilibrium point is approximately +32° C., and the likeliest heat release point is approximately +8° C.

In a heat storage and release process in which the product is kept in thermal balance with an enclosed space, the temperature of which must be regulated between a maximum and minimum level:

thermal energy is supplied to the product at a temperature at least equal to the change of state point until the temperature of the product begins to rise above this point;

the temperature of the product is allowed to evolve, and when it reaches the minimum temperature selected for regulation of the enclosed space, the product is placed quickly in contact with the cold source of a thermal appliance until nucleation of the entire product is initiated in all emulsion droplets;

the temperature of the product is allowed to rise to the change of state point, and the released thermal energy is used to raise the temperature of the enclosed space until the maximum selected temperature is reached;

heat release is halted by placing the product in contact with the hot source of the thermal appliance.

Heat energy supplied at the hot source of the thermal appliance helps to heat the enclosed space.

In this process, the product used is preferably constituted by an emulsion, in an oil to which an emulsifying agent has been added, of a solution of $Na_2SO_4$ close to the hydrate $Na_2SO_4,10\ H_2O$, in which borax is finely dispersed as nucleating agent, the change of state point is approximately +32° C., and the heat release point is approximately +8° C.

According to this process, thermal energy can be stored in the product at a temperature above the change of state point, after which this product can be conveyed through unlagged pipes, for example in a floor at a temperature of slightly above 10° C., and the heat energy can be released at a remote point by initiating nucleation.

It will be easier to understand the invention from the following description of one of the possible sets of experiments performed during preparation of the product and application of this product, this description being given by way of illustration, but not of limitation.

Emulsions containing droplets with a concentration of approximately 1 mole $Na_2SO_4$ to 10 moles water, i.e. 44 g $Na_2SO_4$ to 100 g solution, cannot be prepared directly. First, an emulsion of an under-saturated solution containing 30 g $Na_2SO_4$ and 5 g borax to 100 g solution is prepared in a paraffin oil vehicle combined with an emulsifying agent which encourages a water-in-oil emulsion. This gives a creamy emulsion with a viscosity of approximately 14 poises at 20° C., containing droplets of approximately 1 micron in diameter. The dispersed solution can then be evaporated, for example at 30° C., without precipitation of salt in the droplets, until a concentration similar to that of the solid hydrated salt is achieved, such as 41%.

This emulsion is placed in a Perkin Elmer D.S.C.2. enthalpimeter and subjected to continuous cooling (5° C.×min$^{-1}$) during which predominant crystallizations are observed around −46° C. During the following heating (5° C.×min$^{-1}$) slight eutectic fusion and transition at a temperature of +32° C. are observed.

During the next cooling (5° C.×min$^{-1}$) supersaturation is observed to break between +12° C. and −7° C. with two crystallization peaks at +7° C. and −2.5° C.

These two exothermal peaks represent calorific energy corresponding to approximately 70% of that of the endothermal peak observed at 32° C. during heating.

Initial crystallization at −46° C. shows a high level of supersaturation, proving that the borax itself has also remained supersaturated. It should be noted that when there is no borax the supersaturation break occurs at approximately −41° C. The low eutectic fusion shows that not all the water has been included in the salt in the form of crystallization water at the point of supersaturation break.

The appearance during the second cooling of two crystallization peaks reveals the nucleating effect of the borax, which has precipitated during the first cooling and partly dissolved during reheating. A convenient quantity of borax is used for this condition to be met. The nucleating effect of borax has been confirmed by studying an emulsion containing no borax in which a very high degree of supersaturation is noted during the second cooling, the same as that observed during the first cooling.

The existence of two crystallization peaks during cooling shows different behaviour for two populations of droplets. This result could be attributed to the presence of droplets of different diameters, except that in this case the phenomenon should also be observed during the first crystallization. It is likelier that borax does not have the same effect in all droplets. The nucleating effect of borax microcrystals would then comply with a distribution law governed by temperature, which would be reflected precisely by the form of the peaks. The borax also seems to be less active when dispersed in droplets than in macroscopic phase. However, in this case all the liquid crystallizes as soon as the first nucleations resulting from a number of active borax centres, which may be quite low, have been initiated. In emulsion, they concern too few droplets to be detectable. Borax obtained after high supersaturation may also be less active.

Thirty successive cooling/heating cycles were performed between $+40°$ C. and $-15°$ C. Phenomena are found to occur with significant increase in storage, the ratio of crystallization areas observed during thirtieth and first cycles being 1.16.

Increased crystallization is also observed around $+7°$ C., which could reflect an improvement in the nucleating capacity of borax. Good conservation of the emulsion during the thirty cycles is also evidence, because coalescences would be bound to cause reduction in efficiency.

Coalescences may have a twofold effect: by increasing the size of dispersed droplets, they could make earlier non-significant nucleations on very fine dispersions effective, but they could also locally, and later generally, cause a return to macroscopic volumes and harmful anhydrous sulphate segregations.

The following example describes an application of the product prepared set forth above.

EXAMPLE 1

A 5-room house with 100 square meters living floorspace requires 5 Kwatts to heat it in cold weather, averaging out day and night, i.e. a consumption of 120 kWh per 24 hours.

This energy can be calculated as follows:

120,000 watts $\times 3,600 = 432 \cdot 10^6$ joules which, when divided by 4.18, represents approximately $10^8$ calories.

The change of state heat of $Na_2SO_4, 10 H_2O$ is 58 calories per gram.

Approximately 1.7 tonne of this product, i.e. approximately 1 cubic meter, is needed to store $10^8$ calories.

Assuming that the extra volume of emulsifying agent, container, circulating pipes and other ancillary equipment is 1 cubic meter, it can be seen that a volume of 2 cubic meters, which can be housed in a basement, allows complete heating of such a house for 24 hours during cold weather.

Solar heating, backed up by a thermal appliance, is therefore possible under satisfactory storage conditions.

Expenditure of energy connected with the thermal appliance can be assumed in this case to be very low, since it is used only to cool the storage product by about $10°$ C. for nucleation, and the heat produced is added to the heat released. The normal performance coefficient of heat pumps can be expected to be raised by approximately 2 to 3, with a drop in consumption in the same ratio.

The advantage of using flat panels to collect solar energy at low temperature is that such equipment operates even under cloudy conditions, whereas concentration devices collect only energy accessible within the solid angle corresponding to the 32 minutes angular diameter of the sun.

The invention is not limited to the embodiments described herein; many modifications and variants may be envisaged by those skilled in the art within the scope of the invention as defined in the appended claims.

What is claimed is:

1. A composition for the storage and conveyance of thermal energy consisting essentially of a water in oil emulsion, said water being in the form of droplets and having dissolved therein sodium sulfate where the weight ratio of said dissolved sodium sulfate in said water is about the same as the weight ratio of sodium sulfate to water in sodium sulfate decahydrate.

2. A composition according to claim 1 wherein the weight ratio of sodium sulfate to water is approximately 0.78 based on anhydrous sodium sulfate.

3. A product for the storage and conveyance of thermal energy according to claim 1 wherein the amount of sodium sulfate in said water is approximately 41% by weight on an anhydrous basis.

4. A composition according to claim 1 including an emulsifying agent to encourage said water in oil emulsion.

5. A composition according to claim 4 wherein said emulsifying agent contains lanolin.

6. A composition according to claim 4 including a nucleating agent to promote crystallization of said sodium sulfate.

7. A composition according to claim 6 wherein said nucleating agent is borax.

8. A process for storing and releasing thermal energy using a product as defined in claim 4, in which:
thermal energy is supplied to the product at a temperature at least equal to the change of state point until the temperature of the product begins to rise above this point;
the temperature of the product is allowed to evolve, and when it reaches "release" point, which is at most equal to the change of state point, heat begins to be released, the temperature of the product returns to the change of state point, and thermal energy is emitted for use as required.

9. A process for storing and releasing thermal energy using a product as defined in claim 4, in which the product is kept in thermal equilibrium with an enclosed space, the temperature of which is regulated between a selected maximum and a selected minimum level, in which:
thermal energy is supplied to the product at a temperature at least equal to the change of state point until the temperature of the product begins to rise above this point;
the temperature of the product is allowed to evolve, and when it reaches the minimum temperature selected for regulation of the enclosed space, the product is placed quickly in contact with the cold source of a thermal appliance until the while product has begun nucleation in all emulsion droplets;

the temperature of the product is allowed to rise to the change of state point, and the released thermal energy is used to raise the temperature of the enclosed space until the maximum selected temperature is reached;

heat release is halted by placing the product in contact with the hot source of the thermal appliance.

10. A process as defined in claim 8 or 9, in which, when it is known that the atmospheric temperature remains higher than the change of state point, after thermal energy has been stored in the product, the product is moved through unlagged pipes to a point where temperature requires regulation, and where the thermal energy is released by initiating nucleation.

11. A method of preparing a product suitable for storage and conveyance of thermal energy comprising the following steps:

dissolving sodium sulfate in water to form a monophasic aqueous solution;

mixing said aqueous solution with a paraffinic oil to form a water in oil emulsion having water droplets with said sodium sulfate dissolved therein;

placing the emulsion in a dry atmosphere at a temperature above the point of change from liquid to solid of sodium sulfate decahydrate until sufficient water has evaporated from said droplets to increase the weight ratio of said sodium sulfate dissolved in said water to about the same ratio of sodium sulfate to water as sodium sulfate decahydrate.

12. A method according to claim 11 further including the steps of:

cooling the emulsion to a temperature far enough below the temperature of change from liquid to solid state to obtain a complete change for the first time;

reheating the emulsion to the point of change of state and supplying thermal energy at this temperature until the temperature of the emulsion begins to rise above the temperature of change of state;

recooling the emulsion to a temperature far enough below the point of change of state to obtain a complete change for a second time; and repeating at least one time the cycle of heating the emulsion to the point of change of state followed by cooling to a temperature far enough below the change of state temperature to obtain another complete change of state.

13. A method according to claim 11 including the step of mixing a nucleating effective amount of borax with said monophasic aqueous solution.

14. A method according to claim 11 wherein lanolin is added to the emulsion to encourage said water in oil emulsion.

* * * * *